(12) United States Patent
Tabor (10) Patent No.: US 11,172,112 B2
(45) Date of Patent: Nov. 9, 2021

(54) IMAGING SYSTEM INCLUDING A NON-LINEAR REFLECTOR

(71) Applicant: EMBEDTEK, LLC, Waukesha, WI (US)

(72) Inventor: Kent Tabor, Pewaukee, WI (US)

(73) Assignee: EMBEDTEK, LLC, Waukesha, WI (US)

(*) Notice: Subject to any disclaimer, the term of this patent is extended or adjusted under 35 U.S.C. 154(b) by 0 days.

(21) Appl. No.: 17/015,876

(22) Filed: Sep. 9, 2020

(65) Prior Publication Data

US 2021/0075945 A1 Mar. 11, 2021

Related U.S. Application Data

(60) Provisional application No. 62/897,975, filed on Sep. 9, 2019.

(51) Int. Cl.
*H04N 5/225* (2006.01)
*G03B 17/17* (2021.01)
*H04N 5/232* (2006.01)
*H04N 7/18* (2006.01)

(52) U.S. Cl.
CPC ........... *H04N 5/2259* (2013.01); *G03B 17/17* (2013.01); *H04N 5/23229* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 1,919,022 A | 7/1933 | Hillman | |
| 3,178,274 A | 4/1965 | Duncan et al. | |
| 3,620,603 A | 11/1971 | White | |
| 4,653,877 A | 3/1987 | Hamanishi | |
| 4,741,605 A | 5/1988 | Alfredsson et al. | |
| 4,944,584 A | 7/1990 | Maeda et al. | |
| 4,995,714 A | 2/1991 | Cohen | |
| 5,144,483 A | 9/1992 | Cohen | |
| 5,936,666 A * | 8/1999 | Davis | G08B 29/183 348/143 |
| 6,215,519 B1 | 4/2001 | Nayer et al. | |
| 6,927,922 B2 | 8/2005 | George et al. | |

(Continued)

FOREIGN PATENT DOCUMENTS

JP 2015165610 qA 9/2015
WO WO2018/165117 A1 9/2018

*Primary Examiner* — James M Hannett
(74) *Attorney, Agent, or Firm* — Michael Best & Friedrich LLP (57) ABSTRACT

An imaging system positioned relative to a three-dimensional area for capturing an image includes an image sensor having an X-Y plane and an aspect ratio defined by the quantity of pixels in the X-Y plane; and a non-linear light focusing element constructed with a profile to form an altered view of a three-dimensional desired zone of the area with a desired pixel distribution. The non-linear light focusing element redirects the pixels of the image sensor from an undesired zone of the area to within a frame that encompasses the three-dimensional desired zone of the area to form the altered view of the desired zone. The image sensor captures the altered view of the desired zone to match the aspect ratio of the image sensor.

22 Claims, 11 Drawing Sheets

(56) References Cited

U.S. PATENT DOCUMENTS

| | | |
|---|---|---|
| 6,947,223 B2 | 9/2005 | Gruhlke |
| 7,061,693 B2 | 6/2006 | Zalevsky |
| 7,162,153 B2 | 1/2007 | Harter, Jr. et al. |
| 7,221,399 B2 | 5/2007 | Fujita et al. |
| 7,253,948 B2 | 8/2007 | Sander |
| 7,548,691 B2 | 6/2009 | Tanida |
| 7,554,750 B2 | 6/2009 | George et al. |
| 7,626,769 B2 | 12/2009 | Olmstead et al. |
| 7,646,404 B2 | 1/2010 | Liu et al. |
| 7,719,568 B2 | 5/2010 | Hung et al. |
| 7,812,295 B2 | 10/2010 | Zalevsky et al. |
| 7,876,980 B2 | 1/2011 | Chiba et al. |
| 7,898,746 B2 | 3/2011 | George et al. |
| 7,965,314 B1 | 6/2011 | Miller et al. |
| 8,018,489 B2 | 9/2011 | McCutchen |
| 8,029,705 B2 * | 10/2011 | Bhalakia et al. |
| 8,068,154 B2 * | 11/2011 | Jacob ............... H04N 5/3456 348/294 |
| 8,125,718 B2 | 2/2012 | Edwards |
| 8,139,896 B1 | 3/2012 | Ahiska et al. |
| 8,248,458 B2 | 8/2012 | Schowengerdt et al. |
| 8,368,875 B2 | 2/2013 | Kludas et al. |
| 8,390,932 B2 | 3/2013 | Jia et al. |
| 8,469,565 B2 | 6/2013 | Yatsuda |
| 8,576,326 B2 | 11/2013 | Kawamura |
| 8,619,362 B2 | 12/2013 | Portney |
| 8,690,353 B2 | 4/2014 | Hung et al. |
| 9,007,432 B2 | 4/2015 | Chuang et al. |
| 9,057,871 B2 | 6/2015 | Uchida et al. |
| 9,148,632 B2 | 9/2015 | Harding et al. |
| 9,237,338 B1 | 1/2016 | Maguire, Jr. |
| 9,270,878 B2 | 2/2016 | Ono |
| 9,375,136 B2 | 6/2016 | Webb et al. |
| 9,615,029 B2 | 4/2017 | Stahl |
| 9,681,043 B2 | 6/2017 | Chen et al. |
| 9,686,452 B2 | 6/2017 | Jones |
| 9,703,018 B2 | 7/2017 | Dobschal |
| 9,720,089 B2 | 8/2017 | Katz et al. |
| 9,723,292 B2 | 8/2017 | Ono |
| 9,854,147 B2 | 12/2017 | Cheng |
| 9,928,707 B2 * | 3/2018 | Naylor ............ G08B 13/19602 |
| 2004/0001149 A1 | 1/2004 | Smith |
| 2008/0122922 A1 * | 5/2008 | Geng ............... G08B 13/19697 348/39 |
| 2009/0002523 A1 | 1/2009 | Maekawa |
| 2009/0073254 A1 | 3/2009 | Li et al. |
| 2010/0177160 A1 | 7/2010 | Tocher et al. |
| 2011/0164108 A1 | 7/2011 | Bates et al. |
| 2014/0104389 A1 | 4/2014 | Dharmatilleke |
| 2015/0109513 A1 | 4/2015 | Nayar et al. |
| 2016/0247398 A1 | 8/2016 | Carlsson |
| 2019/0007610 A1 | 1/2019 | Evans et al. |
| 2019/0011610 A1 | 1/2019 | Zalevsky et al. |
| 2020/0374457 A1 | 11/2020 | Yatsuri et al. |

* cited by examiner

FIG. 1

*Prior Art*

FIG. 2

*Prior Art*

IMAGING SYSTEM INCLUDING A NON-LINEAR REFLECTOR

RELATED APPLICATIONS

The present application claims priority to U.S. Provisional Application 62/897,975, filed Sep. 9, 2019, the entire contents of which are hereby incorporated by reference.

BACKGROUND

The present invention relates to an imaging system including a light focusing element, and more specifically, a non-linear light focusing element constructed to adjust the pixel distribution in a three-dimensional area of interest such that the imaging system optically captures the area of interest to view objects that are positioned in different locations of the area relative to the imaging system.

Many imaging systems include X-Y aspect ratios that describe the relationship between the width (X) and the height (Y) of the image. The aspect ratios have a specific resolution with a uniform distribution of pixels that describes the relationship between the width of the pixel compared to the height of the pixel. Typically, the lens of existing optical imaging systems (e.g., optical, UV) have a generally uniform pixel distribution, and an image sensor has an aspect ratio that is defined by the total number of pixels in the X-Y plane for the image sensor. The lens distributes the pixels of a captured image onto the image sensor, and a processor may process the captured image to form an image that has a field of view with an aspect ratio (e.g., 4:3 standard, 16:9 standard, etc.). Other imaging systems, such as thermal imaging cameras, may not include a lens or may include a lens constructed of a material other than glass (e.g., germanium, zinc selenide, etc.). The field of view encompasses or includes all the area in front of the imaging system, with objects closer to the imaging system appearing larger than objects farther from the imaging system. The depth of field of existing imaging systems defines the area of the field of view that appears in focus.

To increase the resolution of an image, the number of pixels or pixel density of a camera sensor increases, which increases the cost to manufacture the camera. In some applications, such as surveillance cameras, a relatively small portion of the image is considered an area of interest or the desired field of view. Therefore, sensors with a uniform distribution of pixels may be unable to provide the desired resolution within the area of interest and, at the same time, many pixels that are processed are not useful for identifying objects that are outside the area of interest.

Figure 1:
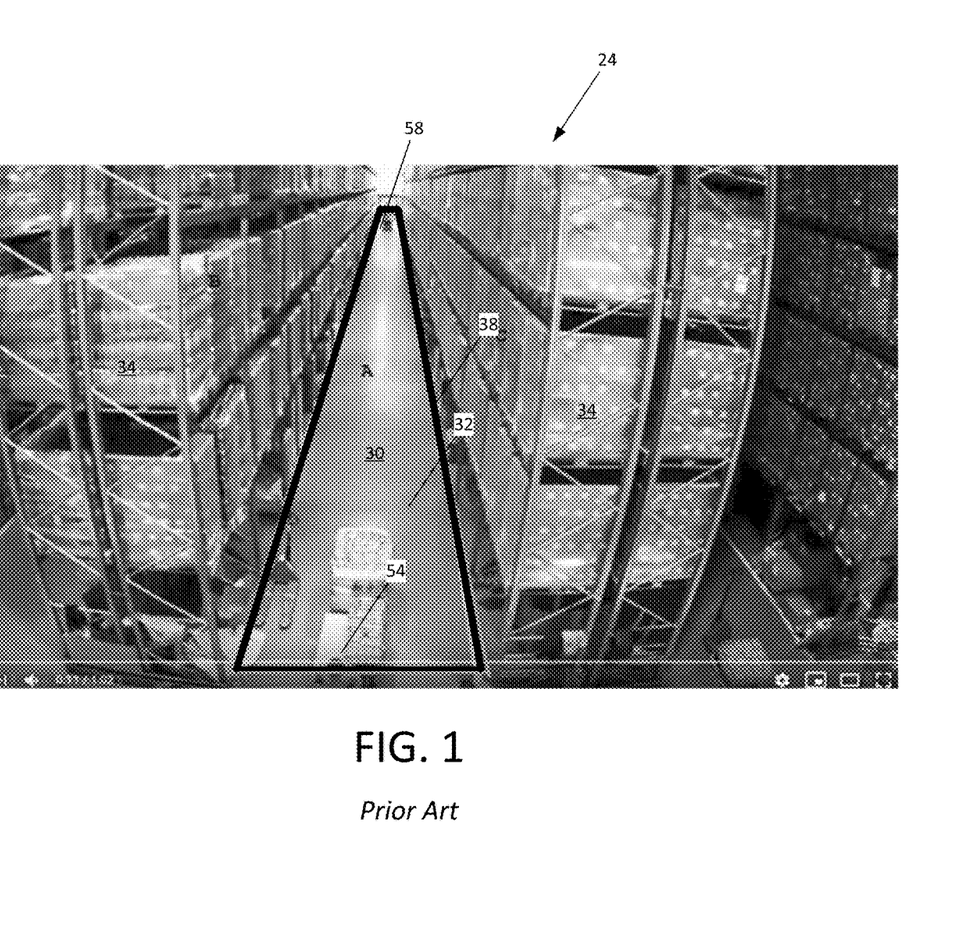
FIG. 1 is an image taken by existing imaging system technology.
Figure 2:
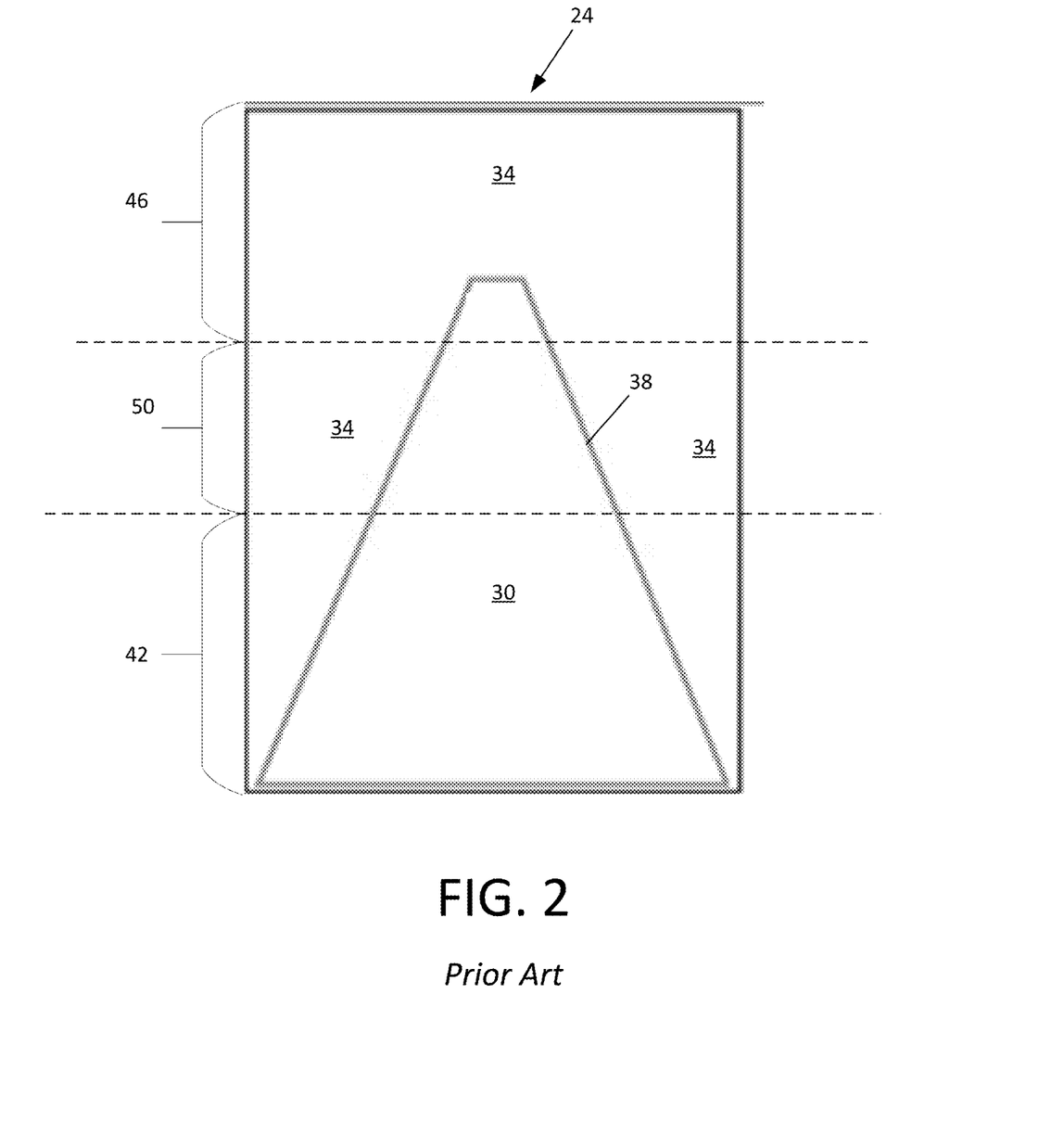
FIG. 2 is a schematic view of the image of FIG. 1.

FIGS. 1 and 2 illustrate an image 24 taken by an existing imaging system with objects that are in close proximity to and far away from the imaging system (referred to as shallow area 42, deep area 46, with a middle area 50 between areas 42, 46). The image 24 captured by the imaging system has a field of view that includes one or more objects (e.g., a person 54) that are generally visible and identifiable in the shallow area 42, and one or more objects (e.g., a vehicle 58) that are blurred and obscured from clear view. The field of view in this example includes a continuous section of an aisle 32 (e.g., taken by a surveillance camera mounted on a wall or ceiling), as well as the area around the aisle 32.

Existing imaging systems cannot separate out or only capture the desired area or frame (e.g., the aisle 32) and eliminate or disregard the undesired area(s) 34 (e.g., the storage racks on each side of the aisle 32, as well as the wall in the distance). Some imaging systems may use motion detection algorithms to block out portions of the image 24 from being monitored. Also, the generally uniform pixel distribution of the lens causes the objects that are positioned relatively close to the imaging system, inside and outside the frame, to appear with a higher resolution than is necessary to view objects in those areas. At the same time, objects relatively far from the imaging system appear with a lower resolution than is necessary to adequately view relevant objects.

The image 24, which is taken by positioning the existing imaging system relative to the aisle 32 to monitor vehicles and people in the aisle to securely monitor the aisle 32, does not adequately provide the ability to readily identify the person 54 and the vehicle 58 in the same image 24. In general, existing imaging system technology produces an image with an object that is close to the imaging system in a form that is larger and with a higher resolution than is necessary to identify the object, and object(s) that is farther from the imaging system in a form that is smaller and with a lower resolution than is necessary to identify the object(s). The vertical scale of the images taken with typical imaging system technology is not linear, so object(s) farther from the imaging system appear much smaller than object(s) closer to the imaging system.

SUMMARY

In one aspect, the disclosure provides an imaging system positioned relative to a three-dimensional area for capturing an image includes an image sensor having an X-Y plane and an aspect ratio defined by the quantity of pixels in the X-Y plane; and a non-linear light focusing element constructed with a profile to form an altered view of a three-dimensional desired zone of the area with a desired pixel distribution. The non-linear light focusing element redirects the pixels of the image sensor from an undesired zone of the area to within a frame that encompasses the three-dimensional desired zone of the area to form the altered view of the desired zone. The image sensor captures the altered view of the desired zone to match the aspect ratio of the image sensor.

In another aspect, a method for capturing an image includes positioning a camera relative to an area, The camera includes an image sensor having an X-Y plane and an aspect ratio defined by the quantity of pixels in the X-Y plane and a non-linear light focusing element constructed with a profile to form an altered view of a three-dimensional desired zone of the area with a desired pixel distribution. The non-linear light focusing element redirects the pixels of the image sensor from an undesired zone of the area to within a frame that encompasses the three-dimensional desired zone of the area to form the altered view of the desired zone matching the aspect ratio of the image sensor. An image of the altered view of the desired zone is captured using the image sensor.

In another aspect, the imaging system further includes a lens constructed to optically capture the altered view of the desired zone.

In yet another aspect, the lens distributes the pixels of the altered view of the desired to match the aspect ratio of the image sensor.

In yet another aspect, the imaging system further includes a processor configured to process the pixels to store and analyze an adjusted image.

Before any embodiments of the present invention are explained in detail, it should be understood that the invention is not limited in its application to the details or construction and the arrangement of components as set forth in the following description or as illustrated in the drawings. The invention is capable of other embodiments and of being practiced or of being carried out in various ways. The description of specific embodiments is not intended to limit the disclosure from covering all modifications, equivalents, and alternatives falling within the spirit and scope of the disclosure. Also, it is to be understood that the phraseology and terminology used herein is for the purpose of description and should not be regarded as limiting.

DETAILED DESCRIPTION

Figure 3A:
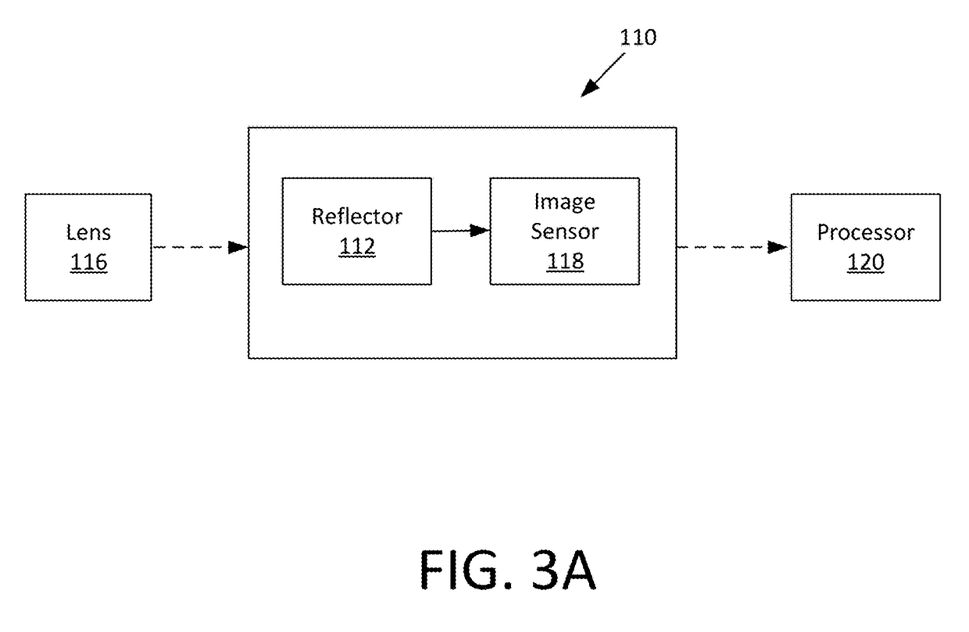
FIG. 3A is a schematic view of an exemplary imaging system of the present invention and including a reflector and an image sensor that optionally communicates with a lens and/or a processor.
Figure 3B:
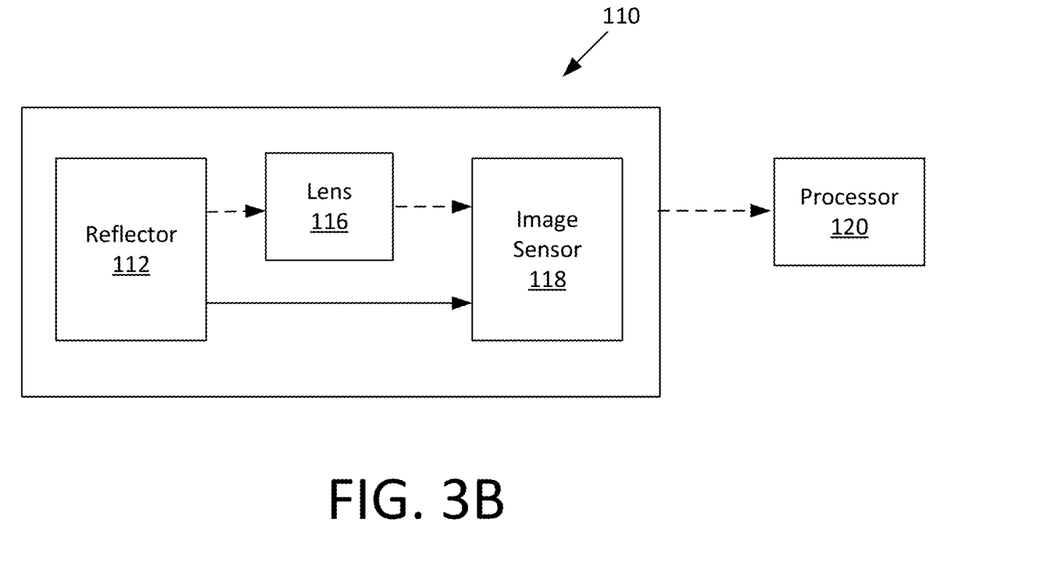
FIG. 3B is a schematic view of another exemplary imaging system including a reflector, an image sensor, and an optional lens, with the image sensor optionally communicating with a processor.
Figure 4:
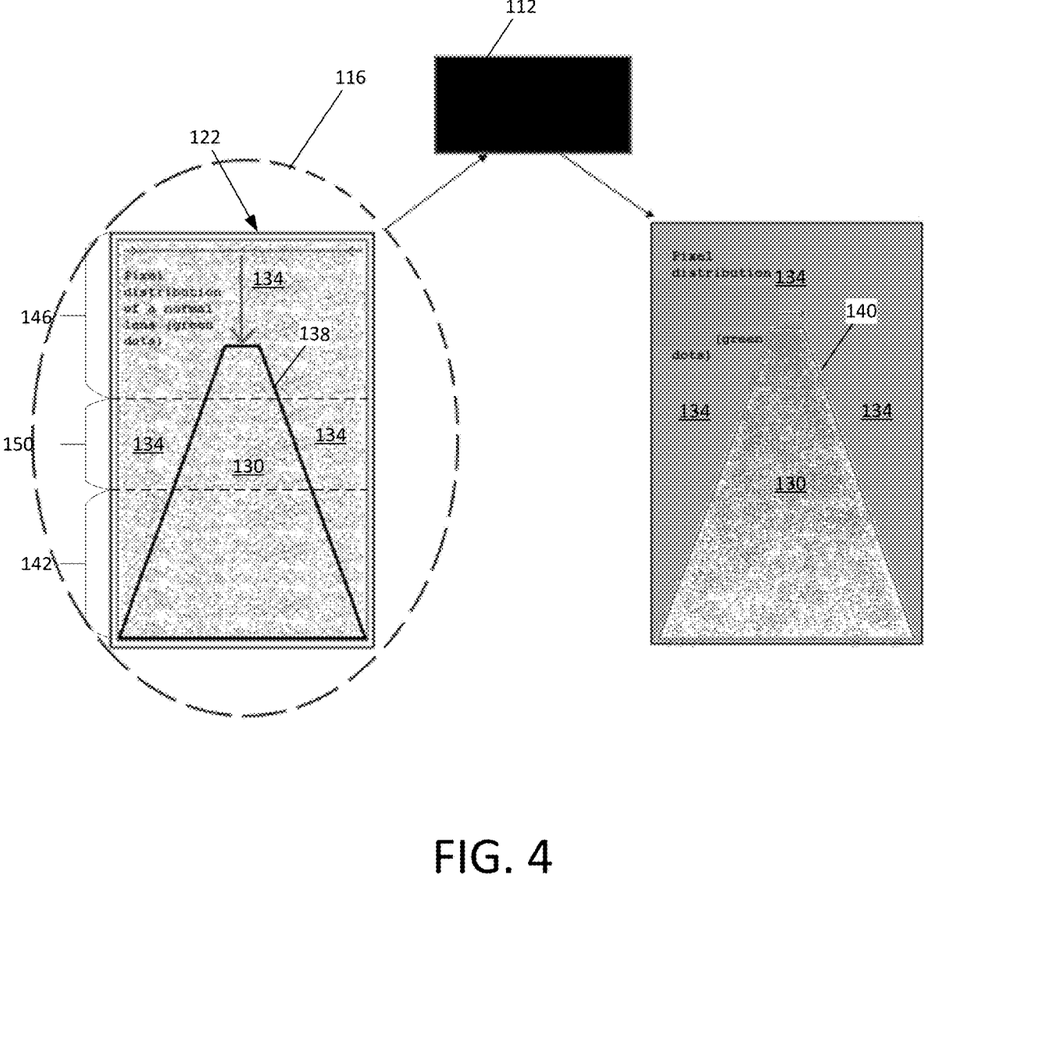
FIG. 4 is a schematic view illustrating a process of redirecting the pixels of the image sensor into a desired zone of a three-dimensional area using the reflector of the imaging system of FIG. 3A or FIG. 3B to define an altered frame.

FIGS. 3A, 3B and 4 illustrate an imaging system 110 of the present invention including a non-linear reflector 112 (e.g., a unitary non-linear reflector, a reflector formed of multiple reflectors, etc.) and an image sensor 118 (e.g., one sensor 118 or more than one sensor 118) having an X-Y plane and an aspect ratio defined by the quantity of pixels in the X-Y plane. The image sensor 118 can take many different forms, including being incorporated in or form part of a visual camera, or the image sensor 118 may include an ultraviolet (UV) sensor, an infrared sensor or receiver (IR), a thermal infrared sensor or receiver, or other sensors that are used to image an area.

The reflector 112 is a highly polished surface (e.g., a mirror) that is constructed to have a unique profile (e.g., contour, shape, size, etc.) to alter the view that is captured by the image sensor 118. More specifically, the reflector 112 redirects (e.g., condense, expand, etc.) the pixels of the image sensor 118 within a three-dimensional area of interest or desired three-dimensional zone(s) 130 so the imaging system 110 captures objects only in the desired zone(s) 130 (defined by a frame 138) of a three-dimensional area 122. The three-dimensional area 122 may be a fixed or stationary if the imaging system 110 is stationary (e.g., mounted to a wall, ceiling, etc.) or dynamic if imaging system 110 is moving (e.g., mounted to a vehicle, a forklift, etc.). In some embodiments, the imaging system 110 captures a continuous portion or segmented (non-continuous) portions of the area 122 that define the desired zone 130. The imaging system 110 capturing the desired zone(s) 130 of the area 122 may include or encompass capturing a part of the area 122, or the entire area 122. In other words, the desired zone 130 may be a small portion of the overall area 122 or the entirety of the area 122.

The unique profile of the reflector 112 is designed for each specific application (e.g., monitoring a storage facility, etc.) to redirect the pixels of the image sensor 118 to form a desired pixel density within the desired zone 130 without wasting pixels on undesired zone(s) 134 outside of the frame 138. For example, the desired pixel distribution may include a unified pixel density or an uneven pixel distribution within the desired zone(s) 130 depending on the application of the imaging system 110 and the desired output image. As shown in FIGS. 3A and 3B, the imaging system 110 may include an optional lens 116 (e.g., a standard lens or a non-linear lens). It should be appreciated that dashed arrows (FIGS. 3A, 3B, 8A, and 8B) and dashed lines (FIGS. 4, 5, and, 9) illustrates the optionality of communication between components. For example, as shown in FIG. 3B the lens 116 may be positioned between the reflector 112 and the image sensor 118 (illustrated by the dashed arrow connecting the reflector 112 to the lens 116 and dashed arrow connecting the lens 116 to the image sensor 118). In other constructions, as shown in FIG. 3A, the lens 116 may be separate from the imaging system 110 and positioned in front of the reflector 112 (illustrated by the dashed arrow connecting the lens 116 to the imaging system 110). In yet another construction, the imaging system 110 may not include a lens 116 (illustrated in FIG. 3A and FIG. 3B with the dashed arrows). The construction of the imaging system 110 may vary based on the application of the imaging system 110 and/or the type of image sensor 118 (e.g., UV, IR, thermal IR, or visual) used.

With reference to FIG. 4, after the unique profile of the reflector 112 is constructed for the specific application, the imaging system 110 and the reflector 112 are positioned relative to a three-dimensional area 122 that encompasses the desired zone(s) 130 and/or the undesired zone(s) 134. The reflector 112 redirects the pixels of the image sensor 118 within the desired zone 130 of the area 122. More specifically, the reflector 112 condenses pixels (e.g., vertically, horizontally, or both vertically and horizontally) from the undesired zone(s) 134 to within the frame 138 to define an altered frame 140 or altered view that is captured by the image sensor 118. In some constructions, the reflector 112 may also expand the pixels positioned relatively close to the imaging system 110. Additionally, the reflector 112 may include microelectromechanical systems (MEMS) to dynamically change the elements, positioning, and/or shape of the reflector 112.

Figure 5:
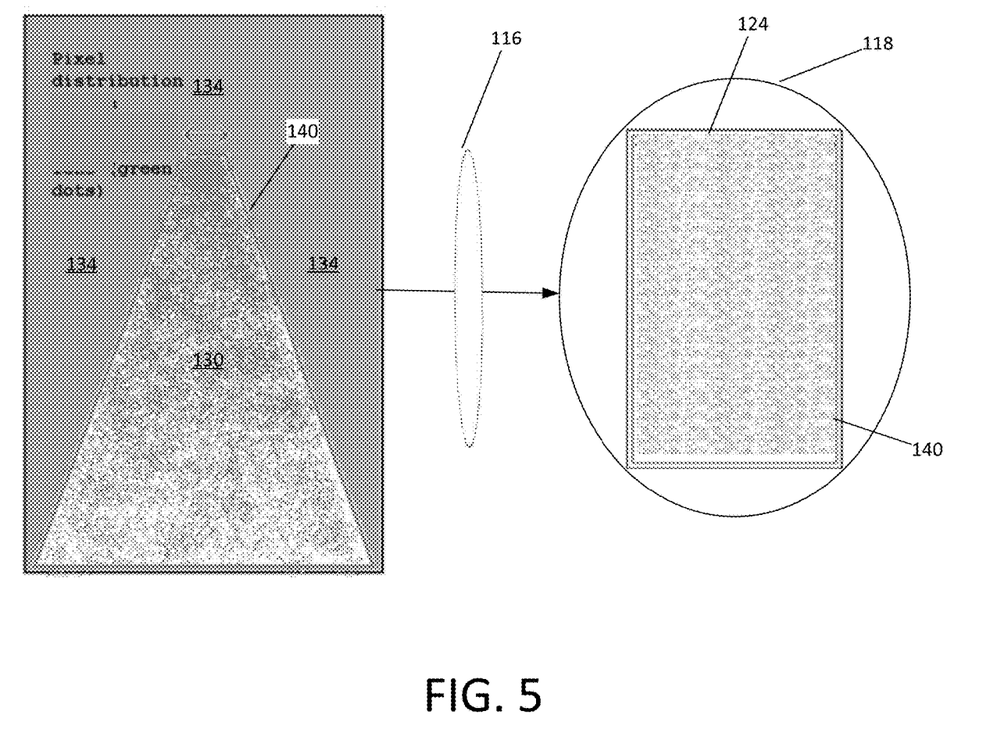
FIG. 5 is a schematic view illustrating a process of capturing the altered frame with the imaging system of FIG. 3A or FIG. 3B to define an adjusted image.

With reference to FIG. 5, the imaging system 110 captures an altered frame 140 and matches or fills the entire aspect ratio of the image sensor 118 so that the entire aspect ratio of the image sensor 118 is utilized only to capture the desired zone 130 (and objects in the zone 130). More specifically, the highly polished surface of the reflector 112 imaging system 110 may create a rectangular image or altered view of the desired zone(s) 130 captured by the image sensor 118. In some constructions, the altered frame 140 may be captured through the optional lens 116 (illustrated by a dashed line in FIG. 5). In these constructions, the lens 116 rearranges or redistributes the pixels of the altered frame 140 to fill the aspect ratio of the image sensor 118. The mapping done by the reflector 112 may be fixed, or the mapping may be done using MEMS technology to dynamically change elements of the reflector 112 and how the pixels are positioned within the desired zone(s) 130 (e.g., by changing the direction of the pixels electronically). For example, the altered frame 140 is expanded so the pixels of the altered frame 140 match or fill the entire aspect ratio of the image sensor 118. More specifically, the lens 116 focuses the desired zone 130 of the area 122 across the aspect ratio of the image sensor 118. The system 100 may include an optional processor 120 (e.g., any combination of a microprocessor, a processing chip, Field Programmable Gate Arrays (FPGAs), etc.) that is integral with or separate from the imaging system 110 to process the desired zone(s) 130. The dashed arrows connecting the imaging system 110 to the processor 120 in FIG. 3A and FIG. 3B illustrates the optionality of the processor 120 communicating with the imaging system 110. Consistent to what is shown in FIG. 5, the processor 120 processes the pixels on the image sensor 118 to store and analyze an enhanced or adjusted image 124. For example, the modified image 124 can be stored using cloud based storage, and analyzed using imaging software such as Optical Character Recognition ("OCR") or other imaging software.

In some constructions, the lens 116 can take the form of the non-linear lens described and illustrated in co-pending, co-owned U.S. patent application Ser. No. 62/894,468, filed Aug. 30, 2019, which is incorporated herein by reference in its entirety. The non-linear lens is an exemplary lens 116 that may be used in conjunction with the reflector 112 to capture an image and process the image to the adjusted image 124. The non-linear lens 116 is constructed to have a unique profile (e.g., contour, shape, and/or size) to optically capture an area of interest or desired zone 130 positioned within the field of view of the imaging system 110. For example, the non-linear lens 116 may be a non-spherical type lens that is manufactured with optical clarity via 3D printing or other technology that is suitable for shaping the lens 116 for the application the system 100 will be applied to. The lens 116 may be constructed of one or more elements that cooperatively define the non-linear nature of the lens 116. For example, the lens 116 may be constructed of any combination of elements that are optically clear, reflective, optically liquid materials (e.g., to form a liquid lens), or include microelectromechanical systems (MEMS). The unique profile of the lens 116 is designed for each specific application (e.g., monitoring a roadway at a tollbooth, monitoring a storage facility, etc.) to remap or redistribute the pixel density to form the desired pixel density within the desired zone 130 without wasting pixels on an undesired zone 134 outside of the frame 138. The profile of the non-linear lens 116 may be constructed to take into account the shape or profile of the desired zone(s) 130 (e.g., width, distance, segmented portions) and the height of the imaging system 110 relative to the area 122 that is being monitored. The profile of the non-linear lens 116 expands a captured frame (or altered frame 140) to match or fill the aspect ratio of the image sensor 118. As a result, the non-linear lens 116 and the reflector 112 are used in unison to capture the adjusted image 124 that includes only the desired or monitored zone 130.

Additionally, the processor 120 may dynamically change the one or more elements of the lens 116 and/or the reflector 112 to adjust the pixel directions and/or the desired zone(s) captured by the lens 116.

The non-linear reflector 112 and the non-linear lens 116 are examples of non-linear light focusing elements that may be used alone or in combination to achieve the pixel remapping described herein.

Figure 7:
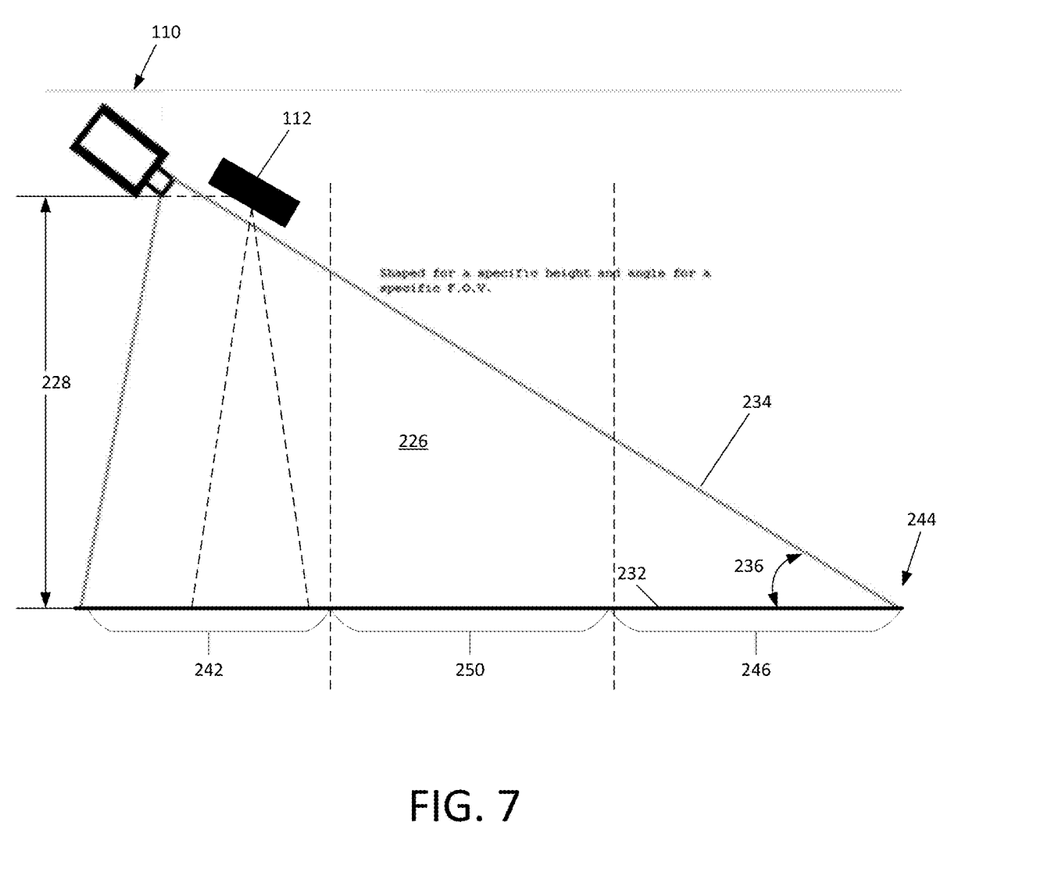
FIG. 7 is an exemplary construction of the imaging system of FIG. 3A or FIG. 3B positioned relative to an area to capture an adjusted image.

FIGS. 4 and 5 illustrate an exemplary embodiment of capturing an adjusted image 124 through the imaging system 100. The imaging system 110 is positioned relative to the area 122 (e.g., as shown in FIG. 7) such that the imaging system 110 and/or the lens 116 (illustrated by the dashed lines in FIGS. 4 and 5) points at the reflector 112. In some constructions, the imaging system 110 may use include a thermal infrared receiver. The wavelengths used with thermal infrared receivers cannot pass thru typical glass lens, so a lens 116 may not be used with the imaging system 110. For example, the imaging system 110 may be pointed at the reflector 112 to magnify and focus on the desired zone 130 of the area 122. In other constructions, the imaging system 110 may be an optical camera that uses a lens 116 that has a fairly uniform pixel distribution or a non-linear lens, described above, that points at the reflector 112 to redirect the pixels of the imaging system 110 to the desired zone 130. As such, it will be appreciated that while FIGS. 4 and 5 illustrate a lens 116, the lens 116 is not required for some applications.

With reference to FIG. 4, the reflector 112 condenses the pixels such that the portion of the altered frame 140 relatively close to the imaging system 110 has the same, or nearly the same, pixels per square unit area (e.g., inches or feet) as the portions of the altered frame 140 relatively far from the imaging system 110. This is referred to as a desired pixel distribution. The altered frame 140 includes the same amount of pixels as the field of view of the area 122. Because the altered frame 140 has more pixels than the pixels associated with the frame 138, the altered frame 140 has a resolution and a clarity that is higher than the initial resolution of the frame 138.

With reference to FIG. 5, the imaging system 110 may capture the altered frame 140 so the pixels are distributed to match the aspect ratio of the image sensor 118. As a result, the size of the objects positioned relatively far from the imaging system 110 are adjusted to be the same size or approximately the same size as the objects positioned relatively close to the imaging system 110.

In one example, after the pixels reflects off the reflector 112 and pass through the lens 116 (illustrated by dashed lines), the adjusted image 124 may be orientated in the wrong direction or distorted. As a result, the processor 120 may determine and correct the positioning of the pixels to produce the adjusted image 124 for the user of the processing system. This can include the system 100 redistributing the pixels within the adjusted image 124 to increase the resolution in specific areas of the adjusted image 124. In some constructions, the processor 120 may transmit the adjusted image 124 to a display over a communication network (e.g., wired, or wireless such as Bluetooth®, Wi-Fi™, etc.) for use by personnel assigned to monitor the desired zone 130.

The imaging system 110 may be used to monitor objects (e.g., vehicles, people, people counting, safety, security, etc.) that are in the desired frame 138 of the field of view for many different applications. The desired zone 130 is predetermined by the application to which the system will be applied. As a result, the desired zone 130 and the construction of the reflector 112 may vary based on the placement of the imaging system 110 or the desired zone 130 of the area 122 the imaging system 110 monitors. While the desired zone 130 shown in the drawings is a continuous zone, it will be appreciated that the desired zone for a particular application may include disjointed or unconnected portions of the area(s) to be monitored.

Figure 6:
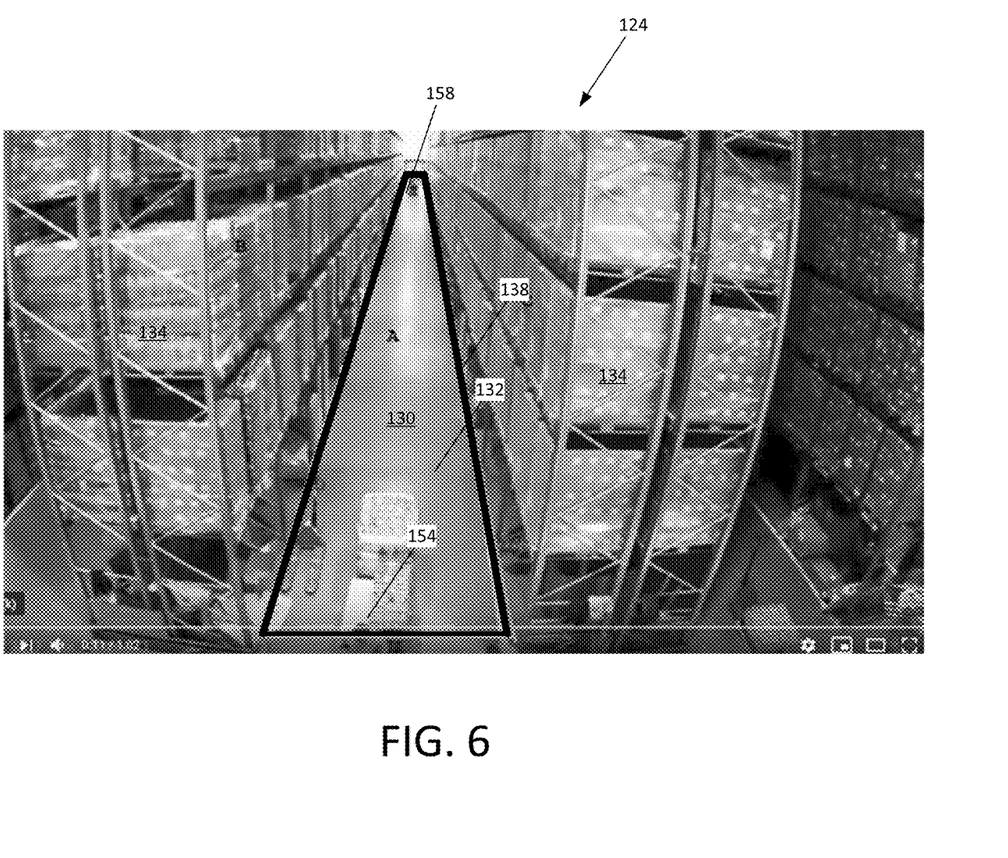
FIG. 6 is an exemplary initial image that is processed to define an adjusted image produced by the imaging system of FIG. 3A or FIG. 3B consistent with what is shown in FIGS. 4 and 5.

FIG. 6 shows how the system 100 can be applied to the storage facility/aisle example shown in FIG. 1. The system 100 focuses on the aisle 132 (i.e. the desired zone 130). The imaging system 110 is positioned above the aisle 132 (e.g., on a wall or ceiling) to monitor vehicles, objects or people in the aisle 132 to identify specific people and/or vehicles (e.g., for safety or security). For example, the illustrated aisle 132 includes a person 154 relatively near to the imaging system 110 (e.g., in a shallow area 142 of the field of view illustrated in FIG. 4) and a vehicle 158 relatively far from the imaging system 110 (e.g., in the deep area 146 of the field of view illustrated in FIG. 4).

The reflector 112 is constructed to condense the pixels within the aisle 132 so the imaging system 110 monitors the aisle 132 without capturing the undesired zone(s) 134 (in this example, undesired zone 134 includes the storage racks on each side of the aisle 132 and the wall in the distance). The desired zone 130 is bounded by a frame 138 that includes a continuous section of the aisle 132 with the person 154 and the vehicle 158.

After the reflector 112 is constructed and positioned relative to the aisle 132 and the imaging system 110, the reflector 112 redirects the pixels from the undesired zone(s) 134 (in this example, the storage racks) to form a desired pixel distribution within the aisle 132. The imaging system 110 captures the frame 138 so that the pixels in the altered frame 140 match or fit the aspect ratio of the image sensor 118. As a result, the person 154 and vehicle 158, which are in different portions of the area 122, are both visible while monitoring of the aisle 132. While the example described in detail herein relates to monitoring the person 154 and vehicle 158 in the aisle 132, it will be appreciated that the system can monitor any number of vehicles, objects, and/or people in the desired frame 138 for any application. Also, the system 100 is applicable to various applications and should not be construed to apply only to storage facility monitoring.

FIGS. 6 and 7 illustrate an exemplary position of the imaging system 110 that has a specific contour for monitoring an area from a specific height 228 above a floor 232 or other surface. The imaging system 110 (and the lens 116 if applicable to the application of the system 110) is positioned at an angle 236 relative to the floor 232, which defines an angular view 226 of the imaging system 110. For example, the imaging system 110 may be a surveillance camera (e.g., a camera in a parking structure or at an end of an aisle in a warehouse, etc.) mounted on a ceiling to monitor a desired zone or area within the angular view 226. For example, the desired zone may be the floor 232.

The angular view 226 defines extents of the image that are visible by the imaging system 110. For example, the angular view 226 includes a shallow area 242, a deep area 246, and a middle area 250 positioned between the shallow and deep area 242, 246. The angular view 226 is bounded by the floor 232 and a set upper limit (e.g., illustrated with line 234) that converges at an angular vantage point 244 in the deep area 246 of the image. The angle 236 of the imaging system 110 and the upper limit 234 of the imaging system 110 may adjusted to encompass a larger or smaller area of the floor 232.

The imaging system 110 is pointed or directed at the reflector 112, which condenses the pixels to form a desired pixel distribution on the rectangular pattern of the floor 232. The reflector 112 is uniquely constructed for each specific height 228 of the image sensor 118. The reflector 112 redirects the pixels from the undesired zone(s) 134 (in this example, outside a rectangular pattern of the floor) within the desired zone 130 to form the desired pixel distribution. The imaging system 100 captures a final image of the floor consistent with the above description of FIGS. 3-5. As a result, a final image of the rectangular pattern of the floor 232 may be monitored.

While the example described in detail herein relates mounting the imaging system 110 on a ceiling to capture a rectangular pattern on the floor 232, it will be appreciated that the system can capture any pattern (e.g., circular, triangular, etc.) to monitor a desired area of the floor 232 or other areas. Also, the system 100 is applicable to various applications be mounted on any surface and can capture a desired image for any application.

Figure 8A:
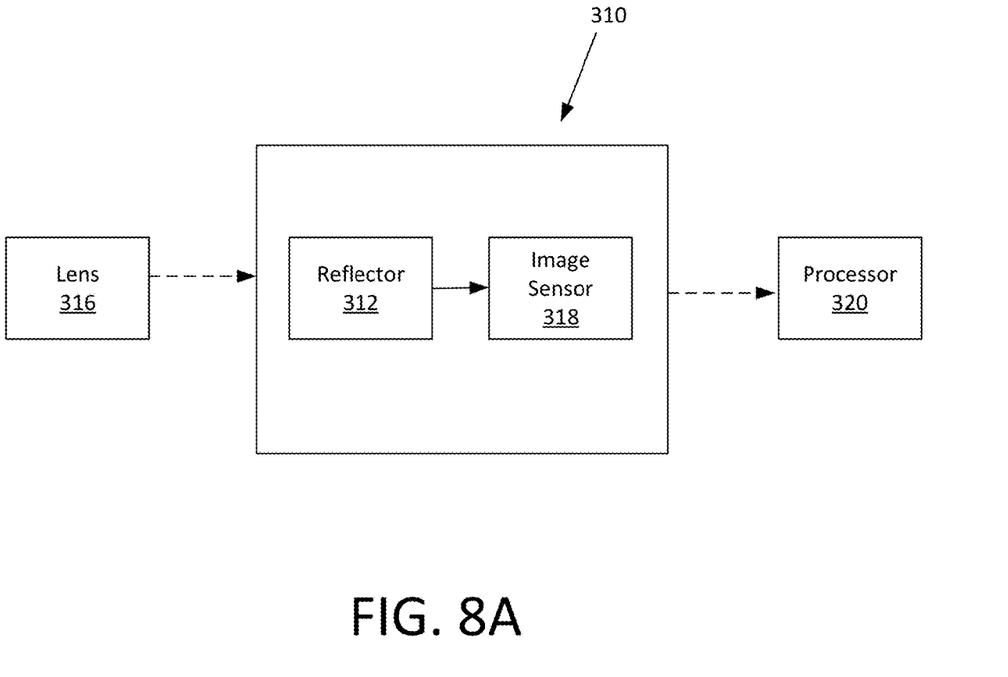
FIG. 8A is a schematic view of another exemplary imaging system including a reflector and an image sensor that optionally communicates with a lens and/or a processor.
Figure 8B:
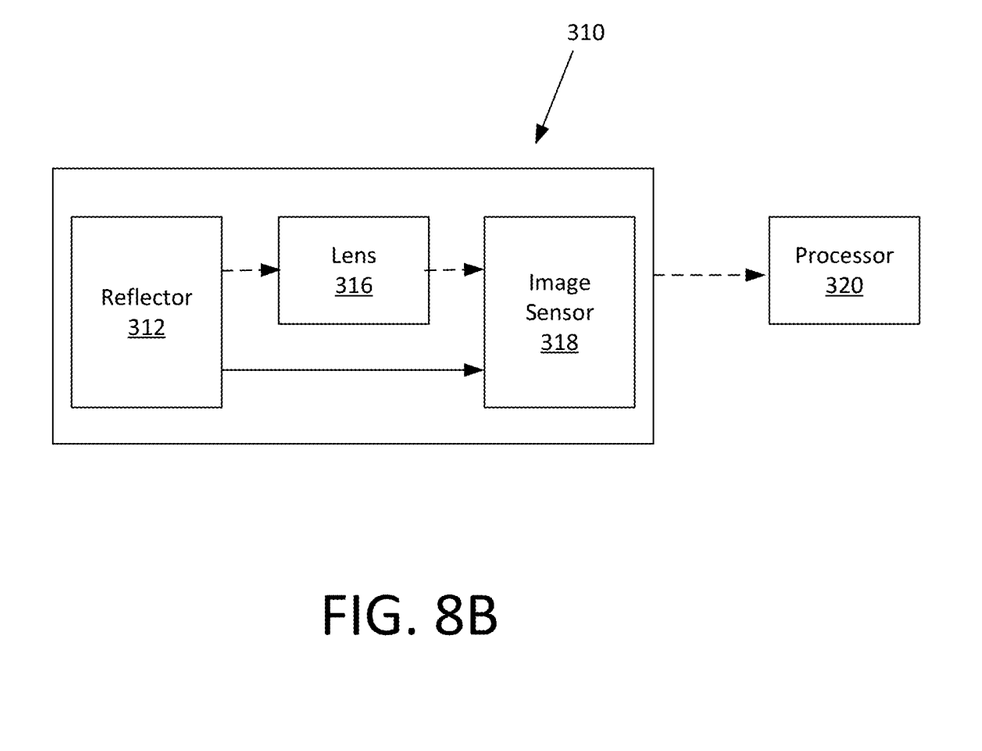
FIG. 8B is a schematic view of another exemplary imaging system and including a reflector, an image sensor, and an optional lens, with the image sensor optionally communicating with a processor.
Figure 9:
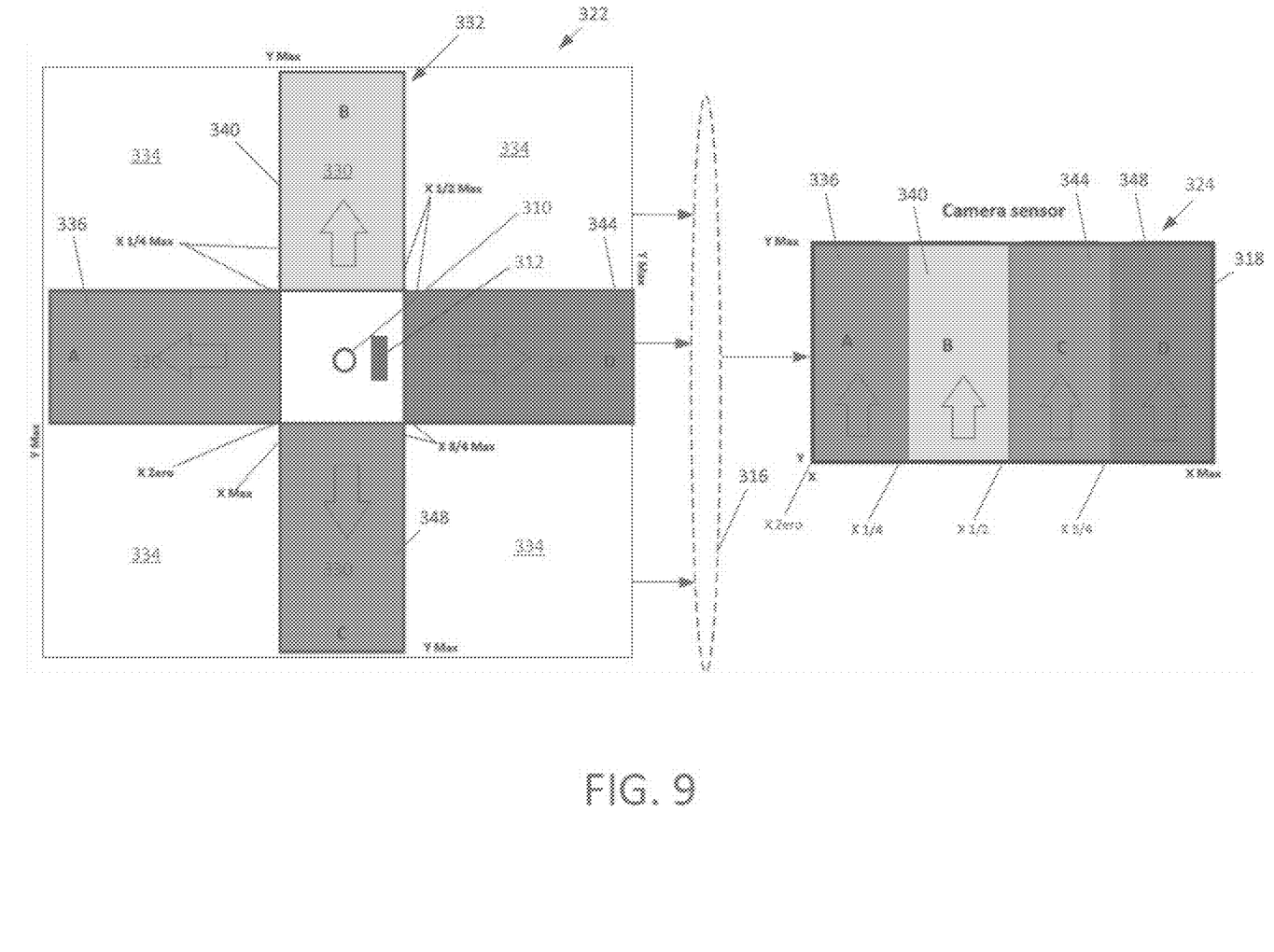
FIG. 9 is a schematic view illustrating a process of capturing a desired intersection having separate zones in an exemplary area using the reflector of the imaging system of FIG. 8A or FIG. 8B to define an adjusted image of the zones.

FIGS. 8A, 8B, and 9 illustrates an exemplary imaging system 310 including a reflector 312, an optional lens 316 (illustrated with dashed arrows in FIGS. 8A and 8B and as explained in detail below), and an image sensor 318 that can be applied to monitor an area 322. The area 322 is defined by an intersection 332 of different paths or desired zones 330 (e.g., roadways, aisles in a facility, etc.) and undesired zone(s) 334 (e.g., sidewalks, buildings, storage racks, etc.) surrounding the intersection 332. The imaging system 310 is positioned relative to the area 322 (e.g., at or adjacent a center position of the intersection 332) to monitor objects at or approaching the intersection 332. In the illustrated construction, the intersection 332 includes a first path 336, a second path 340, a third path 344, and a fourth path 348 that intersect to form the T-shaped intersection 332. While FIG. 9 illustrates a four-zone intersection 332, it will be appreciated that the intersection 332 may have any quantity of paths or desired zones (e.g., two, three, four, five, etc.).

The imaging system 310 captures the paths 336, 340, 344, 348 of the intersection 332 (i.e. the desired zones 330 in this example) without wasting pixels on the undesired zone(s) 334 surrounding the intersection 332. The reflector 312 redirects the pixels of the image sensor 318 within the paths 336, 340, 344, 348 so each path 336, 340, 344, 348 has a desired pixel distribution consistent with what is described with regard to FIGS. 3-5. The imaging system 310 may captured an altered view of the captured paths 336, 340, 344, 348 that matches the pixelated area of the image sensor 318 so that the paths 336, 340, 344, 348 are arranged side by side within the aspect ratio of the image sensor 318. As shown in FIGS. 8A, 8B, the imaging system 110 may include a lens 316 that expands and maps the transposed paths 336, 340, 344, 348 on the image sensor 318 to define an adjusted image 324 with a linear view of the paths 336, 340, 344, 348 having a uniform resolution. As a result, the objects in each path 336, 340, 344, 348 that are in close proximity to and far away from the imaging system 310 have relative clarity in the same image 324. The lens 316 can be placed in front of or before the reflector 312 (as shown in FIG. 8A), or between the reflector 312 and the image sensor 318 (as shown in FIG. 8B).

For example, the lens 316 (illustrated with dashed lines in FIG. 9) maps and expands each path 336, 340, 344, 348 on one-quarter of the surface area of the image sensor 318 so that the paths 336, 340, 344, 348 are positioned in the same orientation relative to each other in the adjusted image 324. In some constructions, a processor 320 (illustrated with a dashed arrow in FIGS. 8A and 8B) may be used to map or rearrange the pixels to achieve the same orientation for the paths 336, 340, 344, 348. Imaging software, such as OCR or machine vision, may be used to analyze the adjusted image 324 to monitor the objects in each path 336, 340, 344, 348.

The embodiment(s) described above and illustrated in the figures are presented by way of example only and are not intended as a limitation upon the concepts and principles of the present disclosure. As such, it will be appreciated that variations and modifications to the elements and their configurations and/or arrangement exist within the scope of one or more independent aspects as described.

The invention claimed is:

1. An imaging system positioned relative to a three-dimensional area for capturing an image, the imaging system comprising:
    an image sensor having an X-Y plane and an aspect ratio defined by the quantity of pixels in the X-Y plane; and
    a non-linear light focusing element constructed with a profile to form an altered view of a three-dimensional desired zone of the area with a desired pixel distribution, the non-linear light focusing element redirecting the pixels of the image sensor from an undesired zone of the area to within a frame that encompasses the three-dimensional desired zone of the area to form the altered view of the desired zone,
    wherein the image sensor captures the altered view of the desired zone to match the aspect ratio of the image sensor, and
    wherein the desired zone comprises an intersection of paths, and the non-linear light focusing element remaps pixels associated with a portion of the area not including the intersection of paths to the desired zone.

2. The imaging system of claim 1, wherein the non-linear light focusing element comprises a reflector.

3. The imaging system of claim 1, further comprising a lens constructed to optically capture the altered view of the desired zone.

4. The imaging system of claim 3, wherein the lens comprises a non-linear lens that distributes the pixels of the altered view of the desired zone to match the aspect ratio of the image sensor.

5. The imaging system of claim 3, wherein the non-linear lens remaps pixels of the area outside the desired zone to within the desired zone.

6. The imaging system of claim 1, further comprising a processor configured to process the pixels to store and generate an adjusted image.

7. The imaging system of claim 1, wherein the non-linear light focusing element remaps the pixels to increase a pixel density associated with a far region of the area.

8. The imaging system of claim 1, wherein the desired zone comprises a surface, and the non-linear light focusing element remaps pixels associated with a portion of the area not including the surface to the desired zone.

9. The imaging system of claim 1, wherein the desired zone comprises a forward zone, and a peripheral zone, and the non-linear light focusing element remaps pixels associated with a portion of the area outside the forward zone and the peripheral zone to the desired zone.

10. A method for capturing an image, comprising:
    positioning a camera relative to an area, the camera comprising an image sensor having an X-Y plane and an aspect ratio defined by the quantity of pixels in the X-Y plane; and a non-linear light focusing element constructed with a profile to form an altered view of a three-dimensional desired zone of the area with a desired pixel distribution, the non-linear light focusing element redirecting the pixels of the image sensor from an undesired zone of the area to within a frame that encompasses the three-dimensional desired zone of the area to form the altered view of the desired zone matching the aspect ratio of the image sensor; and
    capturing an image of the altered view of the desired zone using the image sensor,
    wherein the desired zone comprises an intersection of paths, and the non-linear light focusing element remaps pixels associated with a portion of the area not including the intersection of paths to the desired zone.

11. The method of claim 10, wherein the non-linear light focusing element comprises a reflector.

12. The method of claim 10, wherein the camera further comprises a lens constructed to optically capture the altered view of the desired zone.

13. The method of claim 12, wherein the lens comprises a non-linear lens that distributes the pixels of the altered view of the desired zone to match the aspect ratio of the image sensor.

14. The method of claim 10, wherein the non-linear light focusing element remaps pixels of the area outside the desired zone to within the desired zone.

15. The method of claim 10, further comprising processing the pixels in a processor to store and generate an adjusted image from the captured image.

16. The method of claim 10, wherein the non-linear light focusing element remaps the pixels to increase a pixel density associated with a far region of the area.

17. The method of claim 10, wherein the desired zone comprises a surface, and the non-linear light focusing element remaps pixels associated with a portion of the area not including the surface to the desired zone.

18. The method of claim 10, wherein the desired zone comprises a forward zone, and a peripheral zone, and the non-linear light focusing element remaps pixels associated with a portion of the area outside the forward zone and the peripheral zone to the desired zone.

19. An imaging system positioned relative to a three-dimensional area for capturing an image, the imaging system comprising:
    an image sensor having an X-Y plane and an aspect ratio defined by the quantity of pixels in the X-Y plane; and
    a non-linear light focusing element constructed with a profile to form an altered view of a three-dimensional desired zone of the area with a desired pixel distribution, the non-linear light focusing element redirecting the pixels of the image sensor from an undesired zone of the area to within a frame that encompasses the three-dimensional desired zone of the area to form the altered view of the desired zone,
    wherein the image sensor captures the altered view of the desired zone to match the aspect ratio of the image sensor, and
    wherein the desired zone comprises a surface, and the non-linear light focusing element remaps pixels associated with a portion of the area not including the surface to the desired zone.

20. An imaging system positioned relative to a three-dimensional area for capturing an image, the imaging system comprising:
    an image sensor having an X-Y plane and an aspect ratio defined by the quantity of pixels in the X-Y plane; and
    a non-linear light focusing element constructed with a profile to form an altered view of a three-dimensional desired zone of the area with a desired pixel distribution, the non-linear light focusing element redirecting the pixels of the image sensor from an undesired zone of the area to within a frame that encompasses the three-dimensional desired zone of the area to form the altered view of the desired zone, wherein the image sensor captures the altered view of the desired zone to match the aspect ratio of the image sensor, and wherein the desired zone comprises a forward zone and a peripheral zone, and the non-linear light focusing element remaps pixels associated with a portion of the area outside the forward zone and the peripheral zone to the desired zone.

21. A method for capturing an image, comprising:

positioning a camera relative to an area, the camera comprising an image sensor having an X-Y plane and an aspect ratio defined by the quantity of pixels in the X-Y plane; and a non-linear light focusing element constructed with a profile to form an altered view of a three-dimensional desired zone of the area with a desired pixel distribution, the non-linear light focusing element redirecting the pixels of the image sensor from an undesired zone of the area to within a frame that encompasses the three-dimensional desired zone of the area to form the altered view of the desired zone matching the aspect ratio of the image sensor; and capturing an image of the altered view of the desired zone using the image sensor, wherein the desired zone comprises a surface, and the non-linear light focusing element remaps pixels associated with a portion of the area not including the surface to the desired zone.

22. A method for capturing an image, comprising:

positioning a camera relative to an area, the camera comprising an image sensor having an X-Y plane and an aspect ratio defined by the quantity of pixels in the X-Y plane; and a non-linear light focusing element constructed with a profile to form an altered view of a three-dimensional desired zone of the area with a desired pixel distribution, the non-linear light focusing element redirecting the pixels of the image sensor from an undesired zone of the area to within a frame that encompasses the three-dimensional desired zone of the area to form the altered view of the desired zone matching the aspect ratio of the image sensor; and capturing an image of the altered view of the desired zone using the image sensor, wherein the desired zone comprises a forward zone, and a peripheral zone, and the non-linear light focusing element remaps pixels associated with a portion of the area outside the forward zone and the peripheral zone to the desired zone.

* * * * *